United States Patent [19]

Knopf et al.

[11] 4,163,113

[45] Jul. 31, 1979

[54] ESTER DIOL ALKOXYLATE ACRYLATES

[75] Inventors: Robert J. Knopf, Saint Albans; Joseph V. Koleske, Charleston, both of W. Va.

[73] Assignee: Union Carbide Corporation, New York, N.Y.

[21] Appl. No.: 837,839

[22] Filed: Sep. 29, 1977

[51] Int. Cl.$^2$ ............................................. C07C 69/67
[52] U.S. Cl. .................................. 560/185; 260/465.4; 560/147; 560/156; 560/170
[58] Field of Search ......................................... 560/185

[56] References Cited

U.S. PATENT DOCUMENTS

| 3,645,984 | 2/1972 | Dowbenco et al. ................ 260/78.4 |
| 3,959,201 | 5/1976 | Chang ............................. 260/29.4 R |

Primary Examiner—Paul J. Killos
Attorney, Agent, or Firm—Francis M. Fazio

[57] ABSTRACT

Novel ester diol alkoxylate acrylates prepared by the reaction of an ester diol and an alkylene oxide to produce an ester diol alkoxylate that is subsequently reacted with acrylic acid or methacrylic acid. The novel derivatives are useful as vehicles in coating and ink compositions and as monomers in the production of polymers.

10 Claims, No Drawings

ESTER DIOL ALKOXYLATE ACRYLATES

BACKGROUND OF THE INVENTION

The reaction of ester diols corresponding to the structural formula:

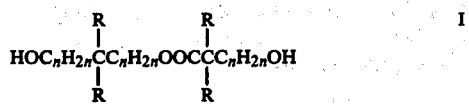

with acrylic acid or methacrylic acid to produce the acrylate derivatives thereof of the structural formula:

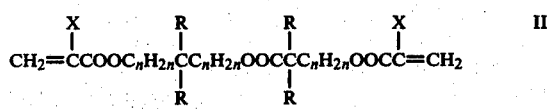

is disclosed in U.S. Pat. No. 3,645,984, issued Feb. 29, 1972 to Dowbenko et al. In the above formulas n in an integer having a value of from 1 to 5, X is hydrogen or methyl and R is an unsubstituted or substituted alkyl group having from 1 to 8 carbon atoms.

Also known to those skilled in the art is the reaction of an alkylene oxide with various initiators to produce the corresponding derivatives thereof, such as the polyoxyethylenes and the polyoxypropylenes. However, not previously suggested or disclosed in the prior art are either the alkylene oxide derivatives of the ester diols of formula I or the acrylate esters of said alkylene oxide derivatives nor their unexpected properties.

SUMMARY OF THE INVENTION

The novel ester diol alkoxylate acrylates of this invention are those defined by the following structural formula:

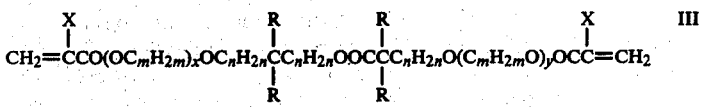

wherein m is an integer having a value of from 2 to 4, preferably 2 or 3; n is an integer having a value of from 1 to 5, preferably 1 to 3 and most preferably 1; x and y are integers each having a value of from 1 to 20, preferably 1 to 10; X is hydrogen or methyl; R is an unsubstituted or substituted, linear or branched alkyl group having from 1 to 8 carbon atoms, preferably 1 to 3 carbon atoms. The substituents on the R group can be any inert group that will not interfere with the reactions involved and can be, for example, cyano, halogen, alkoxyl, nitro, tertiary amine, sulfo, etc. In the formulas the variables R, X, m, n, x and y can be the same or different at the various locations.

DESCRIPTION OF THE INVENTION

The novel ester diol alkoxylate acrylates III are preferably produced by the reaction of an ester diol alkoxylate IV of the structural formula:

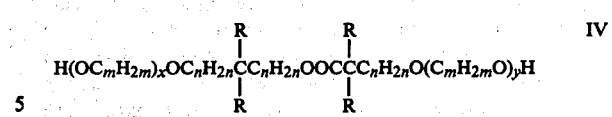

with acrylic acid or methacrylic acid at an elevated temperature as more fully discussed below. The ester diol alkoxylates, in turn, are produced by the reaction of an ester diol I with an alkylene oxide or mixture of alkylene oxides. One can manufacture the mono, mixed, blocked or capped adducts.

Preparation of Ester Diol Alkoxylates (IV)

The alkylene oxides suitable for use in the production of the ester diol alkoxylates (IV) are the oxirane compounds such as styrene oxide, ethylene oxide, 1,2-propylene oxide, 1,3-propylene oxide, 1,2-butylene oxide, 1,3-butylene oxide and 1,4-butylene oxide as well as similar higher aliphatic monoepoxides.

The ester diols of formula I include 2,2-dimethyl-3-hydroxypropyl 2,2-dimethyl-3-hydroxypropionate; 2,2-dimethyl-4-hydroxybutyl 2,2-dimethyl-3-hydroxypropionate; 2,2-dimethyl-4-hydroxybutyl 2,2-dimethyl-4-hydroxybutyrate; 2,2-dipropyl-3-hydroxypropyl 2,2-dipropyl-3-hydroxypropionate; 2-ethyl-2-butyl-3-hydroxypropyl 2-ethyl-2-butyl-3-hydroxypropionate; 2-ethyl-2-methyl-3-hydroxypropyl 2-ethyl-2-methyl-3-hydroxypropionate; and the like.

During the reaction of the ester diol I with the alkylene oxide a catalyst is preferably used in a catalytically effective amount. The amount of catalyst is from 0.01 to 5 weight percent, preferably from 0.05 to 0.5 weight percent, based on the combined weights of ester diol I and alkylene oxide. The catalysts useful are known to those skilled in the art of alkylene oxide addition chemistry and require little further discussion here. Illustrative thereof one can mention boron trifluoride etherate, potassium, potassium hydroxide, sodium, sodium hydroxide, Lewis acids, sodium ethoxide, mineral acids, and the like.

The reaction of the ester diol with the alkylene oxide is carried out at a temperature of from 20° to 150° C., preferably from 50° to 120° C., for a period of time sufficient to complete the reaction between the reactants charged. The temperature is often dependent upon the particular catalyst selected and the alkylene oxide employed. The time will vary depending upon the size of the batch and the particular reactants and catalysts, and the reaction conditions employed.

The reaction can be conducted at subatmospheric, atmospheric or superatmospheric pressure. The pressure is not critical and sufficient pressure is generally used to retain the reactants in the reactor in liquid form.

The amount of alkylene oxide charged to the reaction is from about 2 moles to about 40 moles, or more, per mole of ester diol charged; preferably from 2 to 20 moles.

To minimize oxidative side reactions the reaction is preferably carried out under an inert gas atmosphere using nitrogen, argon or other inert gas.

If desired an inert solvent such as toluene, benzene, 1,1,1-trichloroethane can be employed. However, the reaction proceeds well in the absence of any solvent. In most instances a solvent is not required as the ester diol is itself a liquid at the elevated temperatures employed and serves to maintain a liquid reaction system.

At the conclusion of the reaction the product, consisting of a mixture of the novel ester diol alkoxylates, is recovered as a residue product and can be used as such; distillation procedures can be used to recover more refined products.

Preparation of Ester Diol Alkoxylate Acrylates

The ester diol alkoxylate acrylates III are produced by the reaction of the ester diol alkoxylate IV with acrylic acid or methacrylic acid or mixtures thereof. The concentration of acrylic acid or methacrylic acid used is from about 2 to about 3 moles thereof per mole of ester diol alkoxylate charged. A stoichiometric amount of 2 moles is desired to react with the reactive hydrogen atoms of the hydroxyl groups of the ester diol alkoxylate IV, however, in practice it is preferred to charge a slight excess thereof to ensure complete reaction.

The reaction is preferably carried out under an inert gas atmosphere and in contact with a polymerization inhibitor to minimize or retard polymerization of the acrylyl double bond. Those skilled in the art are fully familiar with such inhibitors, which are used at a concentration of from about 0.01 to 5 weight percent of the mixture. Illustrative thereof one can mention allo-ocimene, hydroquinone, p-methoxyphenol, butylated hydroxylated anisole, 2, 6-di-t-butyl phenol, and the like. It is known that a trace of oxygen is preferred when phenolic type inhibitors are employed.

The reaction is generally carried out at temperatures of from about 50° to about 100° C., preferably from 65° to 80° C. for a period of time sufficient to ensure completion of the esterification of the ester diol alkoxylate IV with the acrylic acid or methacrylic acid to produce the ester diol alkoxylate acrylate III. The time will vary depending upon the size of the batch, the particular reactants and catalysts, and the reaction conditions employed.

An esterification catalyst is also present at a concentration of from about 2 to 25 mole percent of the ester diol alkoxylate IV used, preferably from 6 to 15 mole percent. Any of the known esterification catalysts can be used and illustrative thereof one can mention p-toluene sulfonic acid, methane sulfonic acid, phosphoric acid, and the like.

It is desirable that an inert solvent such as hexane, cyclohexane, as well as those previously discussed, be present, to assist in removing the water produced during the esterification reaction.

The ester diol alkoxylate acrylates III are useful as vehicles in coating and ink compositions, and they can be cured by radiation or by thermal means. Radiation cure can be by ionizing or particulate radiation, such as electron beam, or by actinic radiation, such as ultraviolet light radiation. When curing by actinic radiation one generally includes a photosensitizer or photoinitiator of the many types known in the art. The techniques of radiation and thermal cure are well known to those skilled in the art and require no further elaboration herein to enable such an individual to attain a cure. The ester diol alkoxylate acrylates can be used alone per se or in admixture with other monomers or polymers. The novel ester diol alkoxylate acrylates can also be polymerized in the presence of free-radical catalysts such as the peroxides or azo type compounds.

In a typical embodiment, the acrylic acid, ester diol alkoxylate IV, catalyst, solvent, inhibitor and other additives are charged to a reactor. The mixture is heated under nitrogen and reduced pressure until esterification is substantially completed and then the ester diol alkoxylate acrylate III is recovered by conventional procedures.

Production of Ester Diol Ethoxylates

A reaction vessel was charged with 3,050 grams of refined 2,2-dimethyl-3-hydroxypropyl 2,2-dimethyl-3-hydroxypropionate and purged with nitrogen at 110° C. at a pressure of 5 mm. of Hg. It was cooled to 80° C. and 9 grams of potassium were slowly added.

The mixture was transferred to an autoclave, 3,037 grams, at 80° C. and over a 65 minutes period 1,310 grams of ethylene oxide was added at a reaction temperature of 110° to 112° C. and a pressure of 20 to 58 psi. The mixture was heated at 120° C. and 30 psi for another 0.75 hour and 2,155 grams of the reaction product was transferred to a five liter reactor. The balance of the ester diol ethoxylate was retained in the autoclave.

Ester Diol Ethoxylate (2.2 M)

The product in the five liter reactor was neutralized with 6 ml of acetic acid to a pH of about 6.8 and 3 grams were stripped off at 90° C. and 5 mm Hg pressure. Molecular weight determination indicated that the ester diol ethoxylate had an average of 2.2 ethyleneoxy units in the molecule; it is herein identified as "Ester Diol Ethoxylate (2.2 M)".

Ester Diol Ethoxylate (4.3 M)

The ester diol ethoxylate retained in the autoclave weighed 2,192 grams. Over a 0.75 hour period 649 grams of ethylene oxide was added to this retained product at 110° to 116° C. and a pressure of 20 to 62 psi. The mixture was heated for about another hour at 110° C. and 30 psi after completion of the addition of the ethylene oxide. The product was neutralized and stripped as described above. Molecular weight determination indicated that the ester diol ethoxylate had an average of 4.3 ethyleneoxy units in the molecule; it is herein identified as "Ester Diol Ethoxylate (4.3 M)".

The following examples serve to further illustrate the invention. Unless otherwise indicated parts are by weight.

EXAMPLE 1

A portion of 303 grams of the above Ester Diol Ethoxylate (2.2 M) was pretreated to remove peroxides. Toluene, 264 grams, was added at 50° C. and the mixture was purged with nitrogen to remove oxygen. Then 0.32 gram of allo-ocimene, 189 grams of acrylic acid and 20.6 grams of p-toluene sulfonic acid were added. The esterification was carried out for 7 hours at 69° to 71° C. and a pressure of 141 to 150 mm. of Hg; 32 grams of water distilled. After cooling the mixture, 0.056 gram of the monomethyl ether of hydroquinone was added followed by 782 ml. of 5 percent sodium hydroxide solution to raise the pH to 7. The mixture formed distinct phases; 854 grams of an aqueous phase and 29 grams of a gel phase were removed. The organic solvent phase was vacuum distilled to final conditions of 50° C. and a pressure of less than 1 mm. of Hg. The ester diol ethyleneoxy diacrylate produced was recovered as a residue product; yield was 377 grams. It had a specific gravity of 1.063 g/cc, a Gardner color value of 1.5 and a Brookfield viscosity of 50 cps at 25° C. The corresponding ester diol ethyleneoxy dimethacrylate is produced by substitution of methacrylic acid for the acrylic acid in the reaction.

Addition of 1.0 weight percent of di-sec-butoxy acetophenone to a portion of the product and coating the sensitized clear coating composition produced on a steel panel followed by exposure of the coating to ultraviolet radiation yielded a clear, dry film coating.

EXAMPLE 2

A portion of 395 grams of the above Ester Diol Ethoxylate (4.3 M) was treated to remove peroxides. At 50° C., 264 grams of toluene were added and the mixture was purged with nitrogen. Then 0.95 gram of allo-ocimine, 189 grams of glacial acrylic acid, 20.6 grams of p-toluene sulfonic acid and 0.095 gram of the monomethyl ether of hydroquinone were added. The esterification was carried out for about 6 hours at about 73° C. and a pressure of 130 to 153 mm. of Hg; 28.7 grams of water distilled. After cooling the mixture was neutralized with 950 ml. of a 5 percent solution of sodium hydroxide to a pH of 8.5. The layers were separated and the organic layer was vacuum distilled to remove solvent. The filtered ester diol ethoxylate diacrylate produced was recovered as a residue product; yield was 453 grams. It had a specific gravity of 1.074 g/cc, a Gardner color value of 1 and a Brookfield viscosity of 77 cps at 25° C.

Addition of photoinitiator and cure as described in Example 1 yielded a clear, dry film coating.

EXAMPLE 3

Following the procedure described above for making the Ester Diol Ethoxylates (2.2 M) and (4.3 M), ester diol ethoxylate was produced containing an average of about 6 ethyleneoxy units in the molecule; it is herein identified as "Ester Diol Ethoxylate (6 M)". A 238 grams portion of Ester Diol Ethoxylate (6 M) was treated to remove peroxides. At 40° C., 185.5 grams of toluene were added and the mixture was purged with nitrogen. Then 0.48 g gram of allo-ocimene, 94.5 grams of acrylic acid and 10.3 grams of para-toluenesulfonic acid were added and the esterification was carried out at 69° to 73° C. for 7 hours at 154 to 159 mm. Hg. pressure. Fourteen grams of water distilled. After cooling, 0.095 gram of the monomethyl ether of hydroquinone was added and the mixture was neutralized to a pH of 7 with 384 ml. of a 5 percent sodium hydroxide solution. The layers were separated, solvent was distilled from the organic layer and it was filtered. The desired liquid ester diol ethoxylate diacrylate residue product yield was 270 grams. It has a specific gravity of 1.07 gcc, a Gardner color value of 2.5 and a Brookfield viscosity of 83 cps at 25° C.

Addition of photoinitiator and cure as described in Example 1 yielded a clear, dry film coating.

EXAMPLE 4

A stainless steel autoclave was charged with 3,011 grams of solid 2,2-dimethyl-3-hydroxypropyl 2,2-dimethyl-3-hydroxypropionate and 18 grams of boron trifluoride etherate and the contents were heated to 60° C. Then the autoclave was pressured to 10 psi with nitrogen and the ethylene oxide feed was started. A total of 2,604 grams of ethylene oxide was added over a period of about six hours while maintaining the reactor temperature of 65° to 68° C. and the pressure between 10 and 30 psi. After all of the ethylene oxide had been added the temperature was maintained at 65° C. until no ethylene oxide pressure remained in the reactor. The product was cooled to 40° C.; 2 weight percent of magnesium silicate neutralizing agent was added and the mixture was stirred at 40° C. for one hour. The temperature was raised to 90° C. and held while a vacuum was applied to remove volatile products. This vacuum was continued until the pressure in the reactor reached 5 mm of mercury. The clear, colorless product was pressure filtered to remove insolubles. There was recovered 5,494 grams of the liquid ester diol ethoxylate residue product having an average of about four moles of ethylene oxide in the molecule. The average molecular weight was 382, the Cannon Fenske viscosity was 90 cks at 100° F. and the Pt/Co color was 30; it had an acid value of 0.06 percent as acetic acid. Gas chromatographic analysis indicated that the product was free of neopentyl glycol and its adducts.

A mixture of 382 grams of the above ester diol ethoxylate was added to a reactor equipped with a stirrer and decanting still head atop a distilling column and treated to remove peroxides. At 50° C., 264 grams of toluene, 20.6 grams of p-toluene sulfonic acid monohydrate, 189 grams of acrylic acid, 0.95 gram of allo-ocimene, 0.095 gram of the monomethyl ether of hydroquinone, and 0.86 gram of activated carbon were added. The temperature was raised to 70° C. and the pressure was reduced to about 135 mm of Hg on the system until boiling occurred. Refluxing was continued at 70° C. to 72° C. for 12 hours during which period 36 grams of water were removed via the decanting head. At this point the charge was cooled to 25° C. and neutralized to a pH of 8 by the addition of 675 grams of a 5 percent sodium hydroxide solution. The layers were permitted to separate and the top organic layer was stripped of solvent at a maximum temperature of 50° C. while reducing the pressure to 2 mm of Hg. The residue was vacuum filtered with filter aid present to remove the carbon black and 452 grams of the ester diol ethoxylate diacrylate were obtained. It had a Gardner color value of 3 and a Cannon Fenske viscosity of 28.7 cks at 100° F.

EXAMPLE 5

The preparation of the ester diol ethoxylate diacrylate described in Example 4 was repeated using 397.5 grams of 1,1,1-trichloroethane as the solvent. In this instance, the aqueous layer is the top layer in the decanting still head; this layer is removed while the bottom organic layer is returned to the reactor. To maintain a reaction temperature of 71° to 76° C., the pressure was reduced to the range of 310 to 390 mm of Hg. After 13 hours of reaction, 34.1 grams of water had been removed. At this point the temperature was reduced to 25° C. and the reaction mixture was neutralized to pH of 9 by the addition of 520.5 grams of a 5 percent sodium hydroxide solution. The layers were separated and the bottom organic layer was stripped of solvent and filtered as described in Example 4. The ester diol ethoxylate diacrylate recovered weighed 451 grams. It had a Gardner color value of 5 and Cannon Fenske viscosity of 28.5 cks at 100° F.

EXAMPLE 6

Following the procedure described above for making the Ester Diol Ethoxylates, 125 grams of 2,2-dimethyl-3-hydroxcypropyl 2,2-dimethyl-3-hydroxypropionate was reacted at 48° to 132° C. with a total of 502 grams of ethylene oxide using a total of 1.3 grams of potassium as the catalyst. The ethylene oxide feed time was about 9.5 hours. At the completion of the feed 11.9 grams of magnesium silicate were added and the mixture was stirred for one hour and then cooled. The ester diol ethoxylate was filtered hot and stripped under vacuum.

The stripped ester diol ethoxylate residue product recovered weighed about 585.3 grams. It had an average of about 19 ethyleneoxy units in the molecule. The Cannon Fenske viscosity was 115.5 cks at 100° F. On standing it solidified at 25° C., and melted at about 27° C.

The ester diol ethoxylate is then reacted with acrylic acid to produce the corresponding ester diol ethoxylate diacrylate using the procedure described in Example 3.

EXAMPLE 7

In a manner similar to that described in Example 1, 805 grams of 2,2-dimethyl-3-hydroxpropyl 2,2-dimethyl-3-hydroxypropionate and 8 grams of boron trifluoride etherate were melted at 60° C. in a reaction flask. Over a period of about 1.75 hours a total of 811 grams of propylene oxide were added at a temperature of 57° to 60° C. The reaction mixture was stirred about another 2 hours; 32.3 grams of magnesium silicate were added and stirred at about 70° C. for about 1.5 hours. It was then stripped at 70° C. for 0.5 hour at 4–5 mm. of mercury and filtered. The liquid ester diol propoxylate residue product was clear and colorless and weighed 1,508 grams. It had an average of about 4 propyleneoxy units in the molecule.

A 418.2 grams portion of the above was charged to a reactor together with 271 grams of n-hexane, 189 grams of acrylic acid, 0.95 gram of 2, 4, 6-octatriene, 0.86 gram of activated carbon, 0.095 gram of monomethylhydroquinone and 20.6 grams of p-toluene-sulfonic acid. The mixture was heated and stirred under nitrogen at the reflux temperature while continuously removing 35.6 grams of water of esterification azeotropically. After 15.5 hours at 69° to 74° C. the reaction mixture was cooled, neutralized to a pH of 8 with 330.7 grams of 10% aqueous sodium hydroxide solution at a temperature below 30° C. and the two layers were separated. The organic layer was stripped at reduced pressure and temperature below 50° C. under nitrogen to remove solvents. The residue was filtered and 494.5 grams of the ester diol propoxylate diacrylate were recovered as a clear amber liquid having a Cannon-Fenske viscosity of 36.8 cks at 100° F. and a Gardner color of 2.5.

Addition of a photosensitizer to a portion of the product and coating on a steel panel followed by exposure to ultraviolet radiation yields a clear, dry film coating.

Following the procedures described above for making the ester diol ethoxylates, ester diol ethoxylates were produced containing an average of about 10 ethyleneoxy units in the molecule. Likewise a mixed ester diol ethoxylate/propoxylate is produced. These materials are used by the procedures shown in the examples to produce the corresponding ester diol alkoxylate acrylates by reaction with acrylic acid or methacrylic acid.

What is claimed is:

1. An ester diol alkoxylate acrylate of the formula:

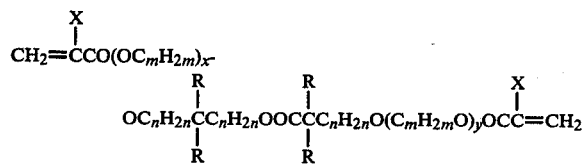

wherein m is an integer having a value of from 2 to 4; n is an integer having a value of from 1 to 5; x and y are integers having a value of from 1 to 20; X is a hydrogen or methyl; and R is an unsubstituted or substituted alkyl group having from 1 to 8 carbon atoms.

2. An ester diol alkoxylate acrylate as claimed in claim 1, wherein X is hydrogen.

3. An ester diol alkoxylate acrylate as claimed in claim 1, wherein m has a value of 2 to 3; n has a value of 1 to 3; x and y have values of from 1 to 10; X is hydrogen and R is an alkyl group having from 1 to 3 carbon atoms.

4. An ester diol alkoxylate acrylate as claimed in claim 1, of the structural formula:

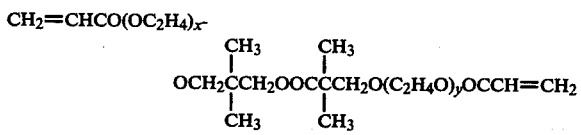

wherein the average sum of x plus y is about 2.

5. An ester diol alkoxylate acrylate of the structural formula as claimed in claim 4, wherein the average sum of x plus y is about 4.

6. An ester diol alkoxylate acrylate of the structural formula as claimed in claim 4, wherein the average sum of x plus y is about 6.

7. An ester diol alkoxylate acrylate of the structural formula as claimed in claim 4, wherein the average sum of x plus y is about 10.

8. An ester diol alkoxylate acrylate of the structural formula as claimed in claim 4, wherein the average sum of x plus y is about 19.

9. An ester diol alkoxylate acrylate as claimed in claim 1, of the structural formula:

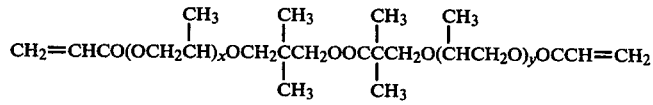

wherein the average sum of x plus y is from about 2 to about 40.

10. An ester diol alkoxylate acrylate of the structural formula as claimed in claim 1, wherein the —$OC_mH_{2m}$— groups are mixtures of ethyleneoxy and propyleneoxy groups.

* * * * *